United States Patent [19]

Park

[11] Patent Number: 5,543,978
[45] Date of Patent: Aug. 6, 1996

[54] ADAPTIVE EQUALIZER OF DISK REPRODUCING APPARATUS USING A CONSTANT ANGULAR VELOCITY METHOD

[75] Inventor: Hyoung-woon Park, Suwon, Rep. of Korea

[73] Assignee: Samsung Electronics Co., Ltd., Kyungki-do, Rep. of Korea

[21] Appl. No.: 365,945

[22] Filed: Dec. 29, 1994

[30] Foreign Application Priority Data

Sep. 27, 1994 [KR] Rep. of Korea ............... 94-24352

[51] Int. Cl.⁶ .................. G11B 15/04; G11B 5/09
[52] U.S. Cl. ....................... 360/65; 360/46; 375/232
[58] Field of Search ............... 360/65, 46; 364/724.19, 364/724.2; 375/232

[56] References Cited

U.S. PATENT DOCUMENTS

| | | | |
|---|---|---|---|
| 4,575,857 | 3/1986 | Murakami | 375/232 X |
| 5,060,088 | 10/1991 | Dolivo et al. | 360/65 X |
| 5,313,411 | 5/1994 | Tsujimoto | 364/724.19 |
| 5,357,524 | 10/1994 | Shimpuku et al. | 341/59 X |

*Primary Examiner*—Aristotelis Psitos
*Assistant Examiner*—Regina Y. Neal
*Attorney, Agent, or Firm*—Leydig, Voit & Mayer

[57] ABSTRACT

An adaptive equalizer includes a recording density detector for calculating a recording density reference value by obtaining the track radius using input track information, a reference tap coefficient storage portion for storing the reference tap coefficient obtained according to the channel impulse response at the lowest density position, a tap coefficient controller for obtaining a tap coefficient according to the recording density using the recording density reference value on the basis of the reference tap coefficient stored in the reference tap coefficient storage portion, and a waveform equalizer for eliminating the interference of the signal adjacent to the input reproducing digital signal using the tap coefficient obtained from the tap coefficient controller, to output the reproducing information signal. Therefore, the recording density is assumed by the track information of the reproduced data and the reproduction signal is adaptively waveform-equalized, so that high-speed real-time processing is possible and the circuit construction can be simplified.

4 Claims, 3 Drawing Sheets

SAMPLES

SAMPLES

ADAPTIVE EQUALIZER OF DISK REPRODUCING APPARATUS USING A CONSTANT ANGULAR VELOCITY METHOD

BACKGROUND OF THE INVENTION

The present invention relates to a disk reproducing apparatus using a constant angular velocity, and more particularly, to an adaptive equalizer for controlling a tap coefficient of a filter by assuming a recording density of each track.

Recently, according to the high density recording of magnetic recording media, e.g., hard disks and floppy disks, and optical recording media such as magneto-optic disks, compactsdisks and laser disks, there is an increasing problem of errors in the reproduced data, which is caused by increased interference between adjacent signals.

Generally, an equalizer is used for raising the recording density by eliminating the interference between adjacent signals. There are various kinds of equalizers, for example, a cosine equalizer adopting an analog method and a partial response maximum likelihood (PRML) equalizer and decision feedback equalizer (DFE) which adopt digital methods.

Meanwhile, the recording density is different even in one disk. That is, in the case of disk recording media using the constant angular velocity method, since the inner diameter of the disk is smaller than the outer, the relative recording density is increased for the inner diameter tracks. Thus, an adaptive equalizer is required for tracking and compensating the channel characteristics that change according to a change in the recording density.

The conventional adaptive equalizer is composed of a finite impulse response (FIR) filter which is a type of transverse filter, and has a transfer characteristic as given in the following equation (1).

$$y_k = \sum_{n=-N}^{n=K} C_k \gamma_{(k-N)} \quad (1)$$

where $C_k$ is a tap coefficient.

An error signal $e_k$ which is the difference between an interference-free reproduced information signal $Y_k$ obtained from the above equation (1) and reproduced data $d_k$ detected from the reproduced information signal is determined using the following equation (2).

$$e_k = y_k - d_k \quad (2)$$

The tap CO efficient of the equalizer is adjusted using the following equation (3) for a means square error to be minimized according to the adaptive algorithm.

$$C_{k+1} = \beta C_k + \mu e_k \gamma_k \quad (3)$$

Where $\beta$ is a leakage factor and $\mu$ is a step size. However, since the above equation (3) is a least mean sequence (LMS) algorithm, the hardware necessary to implement the algorithm is complicated due to the many multiplication operations required. Thus, in order to simplify the hardware, a signed LMS algorithm is used as in the following equation (4).

$$C_{k+1} = \beta C_k + \mu e_k \text{sign}(\gamma_k) \quad (4)$$

However, the adaptive algorithm requires a long processing time and has many hardware restrictions for real-time processing. That is, the hardware is complex, the performance is reduced due to low precision and processing latency, and real-time processing is difficult. Furthermore, since high-speed hardware is required so that high density recording may be performed at high-speed, a constant equalizer rather than the adaptive equalizer is used for high-speed processing. However, a recently developed adaptive equalizer (RAN-DFE) has a maximum processing speed of 48 Mbps.

Also, the conventional adaptive equalizer always requires a learning process for tracking and compensating the change of channels characteristics. As a result, data for learning is required for every sector and the data storage region is reduced by the amount of learning data required.

SUMMARY OF THE INVENTION

To solve the above problem, it is an object of the present invention to provide an adaptive equalizer for high-speed real-time processing, by assuming the recording density using the track information.

To achieve the above object, the adaptive equalizer according to the present invention comprises a recording density detector for calculating a recording density reference value by obtaining the track radius using the input track information a reference tap coefficient storage means for storing the reference tap coefficient obtained according to the channel impulse response at the lowest density position, a tap coefficient look-up table for obtaining a tap coefficient according to the recording density using the above recording density reference value on the basis of the reference tap coefficient stored in the reference tap coefficient storage means, and a waveform equalizer for eliminating the interference of the signal adjacent to the input reproducing digital signal using the tap coefficient obtained from the tap coefficient controller, to output the reproducing information signal.

Also, the recording density detector is composed of a look-up-table for generating a recording density reference value corresponding to the input track information and a tap coefficient controller is composed of a look-up table for generating a tap coefficient corresponding to the above detected recording density reference value. As a result, circuit constitution is simplified and high-speed real-time processing is made possible.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
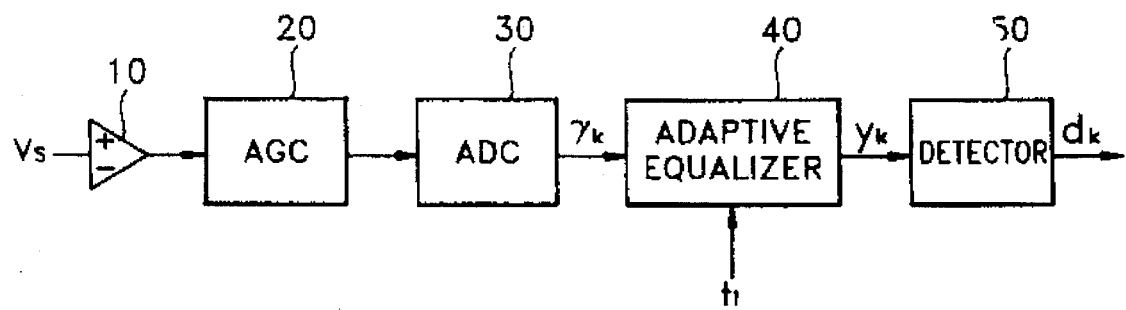
FIG. 1 is a block diagram of a reproducing apparatus for disk-type recording media adopting an adaptive equalizer according to the present invention.

In FIG. 1, the reproducing apparatus comprises a reproducing amplifier 10 for amplifying an analog reproducing signal picked up from the disk by the reproducing head or optical pickup, an automatic gain controller (AGC) 20 for controlling the level of the amplified analog reproducing signal, an analog-to-digital converter (ADC) 30 for converting the gain-controlled analog reproducing signal into a digital reproducing signal, an adaptive equalizer 40 for eliminating the interference between the adjacent signals by receiving the digital reproducing signal to output the reproducing information signal, and a detector 50 for detecting the reproduced data from the reproducing information signal output from the adaptive equalizer 40.

Figure 2:
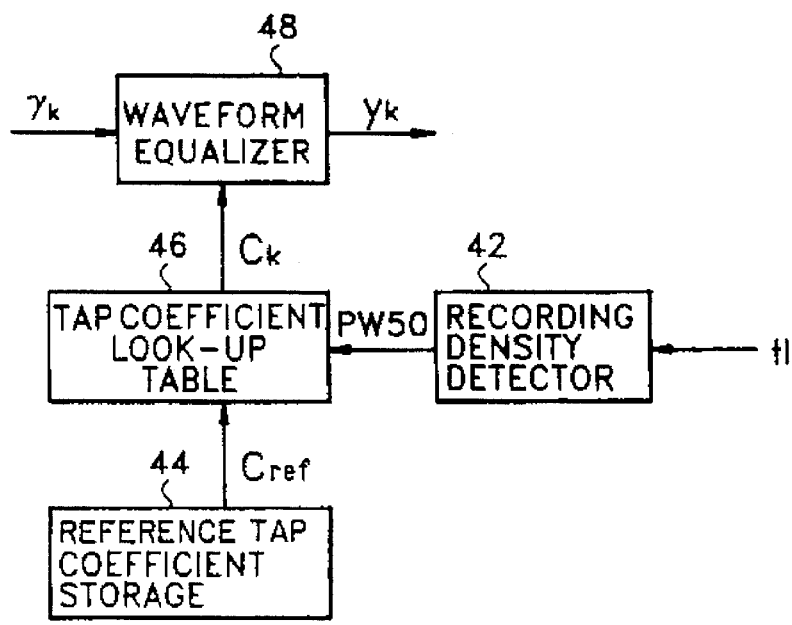
FIG. 2 is a block diagram of the adaptive equalizer according to the present invention.

Referring to FIG. 2, adaptive equalizer 40 according to the present invention comprises a recording density detector 42 for calculating a recording density reference value PW50 by obtaining a track radius r according to track information $t_i$, a reference tap coefficient storage means 44 for storing a reference tap coefficient $C_{ref}$ obtained according to the channel impulse response at the lowest density position, a tap coefficient controller 46 for calculating a tap coefficient $C_{k+1}$ according to the recording density using recording density reference value PW50 on the basis of reference tap coefficient $C_{ref}$ stored in reference tap coefficient storage means 44, and a waveform equalizer 48 for eliminating the interference of the signal adjacent to input reproducing digital signal $\gamma_k$ using a tap coefficient $C_{k+1}$ obtained from tap coefficient controller 46.

Since the length $l_t$ of a track is proportional to a radius r of the disk and an angular velocity is constant in the case of a constant angular velocity disk recording media, a length $l_b$ of one bit of recording data is proportional to radius r and a recording scanning density $D_l$ is inversely proportional to recording radius, as shown in the following equations. Here, recording scanning density $D_l$ is linearly increased as the inner radius is approached.

$$l_t = \pi r \quad (5)$$

$$l_b = l_t \times (rpm/60) \times T \quad (6)$$

$$D_l = inch/l_b \quad (7)$$

In order to eliminate interference between adjacent signals of the reproducing signal, amount of the interference between adjacent signals has to be known and recording density reference value PW50 of the impulse response is used as an index. Here, PW50 represents amplitude at the 50% power point of the impulse response. If the PW50 value is known, the interference between the adjacent signals of the reproducing channel which is used as an index for measuring recording density $D_c$ of the reproducing channel can be assumed.

$$D_c = \frac{1}{PW50/T} \quad (8)$$

Figure 3:
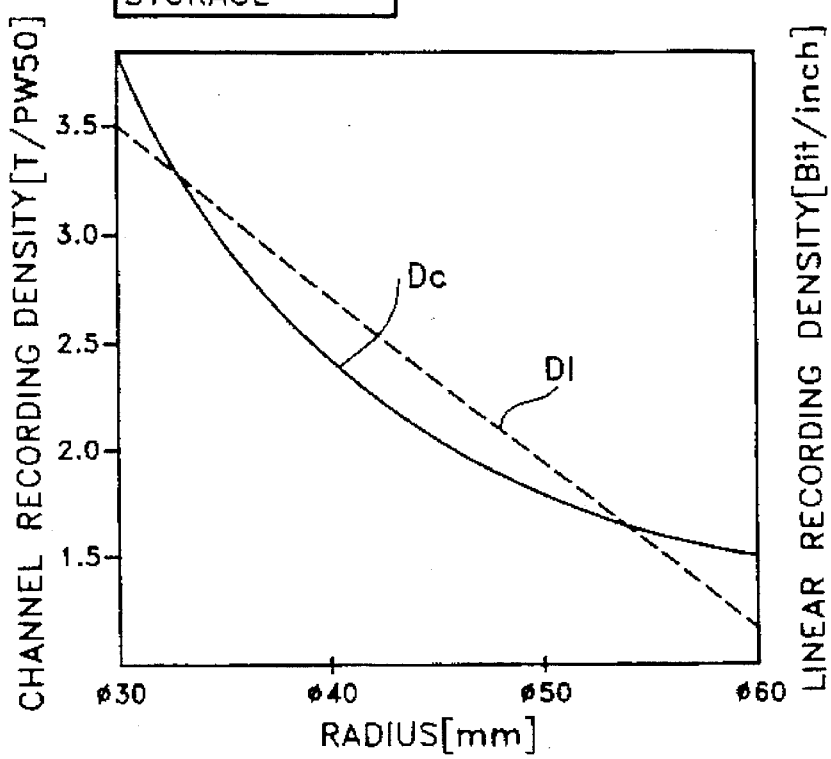
FIG. 3 is a graph showing the relation between the recording density and PW50 at different recording radii.

FIG. 3 is a graph showing the relation between the recording density and PW50 for different recording radii. That is, as shown in FIG. 3, the recording scanning density is linearly increased and the channel recording density is exponentially increased, according to the decreasing radius.

Figure 4:
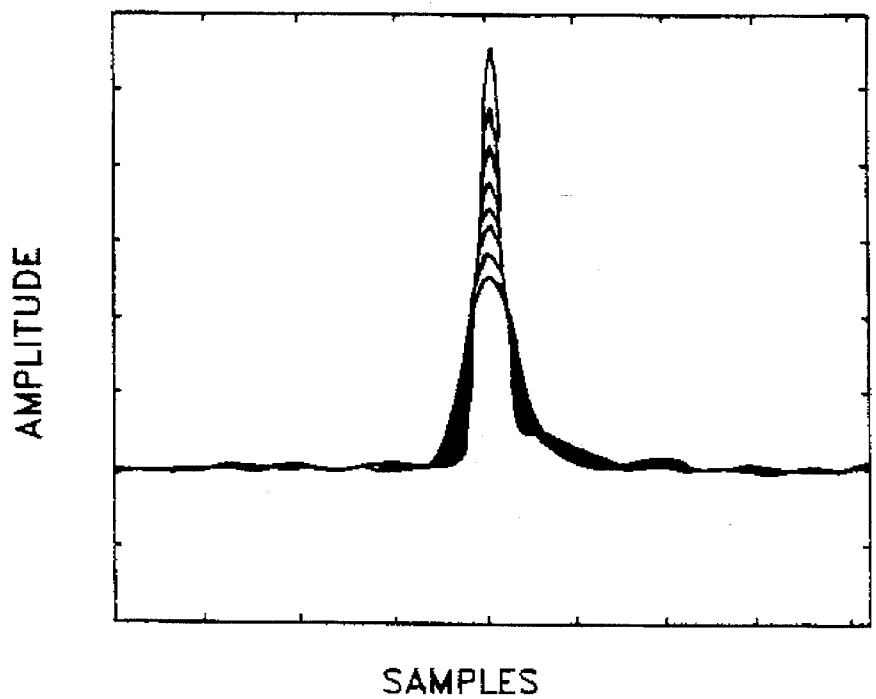
FIG. 4 is a graph showing an impulse response characteristic of the reproduction channel.

FIG. 4 is a graph showing an impulse response characteristic of the reproducing channel. That is, 1 as the radius decreases, the amplitude and the interference of the adjacent signal increase.

Figure 5:
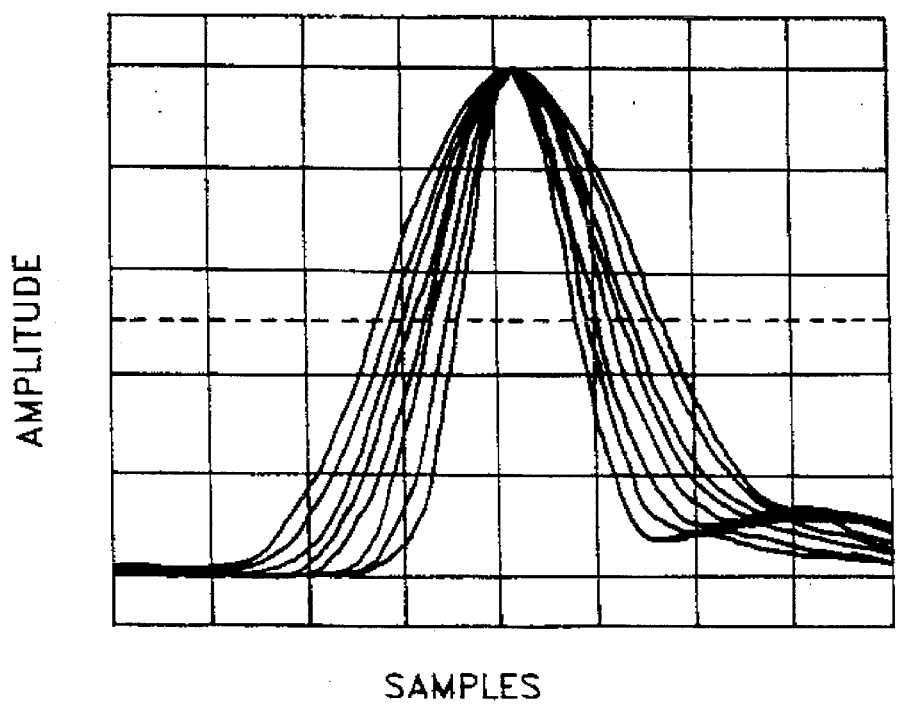
FIG. 5 is a graph showing a normalized impulse response characteristic of the reproduction channel.

FIG. 5 is a graph showing an impulse response characteristic of the reproducing channel normalized from FIG. 4. As shown in FIG. 5, the PW50 value increases in accordance with smaller disk radii. Thus, the characteristic of the reproducing channel density can be mathematically modelled as in the following equation (9).

$$D_c = Ke^{-ar}C \quad (9)$$

Figure 6:
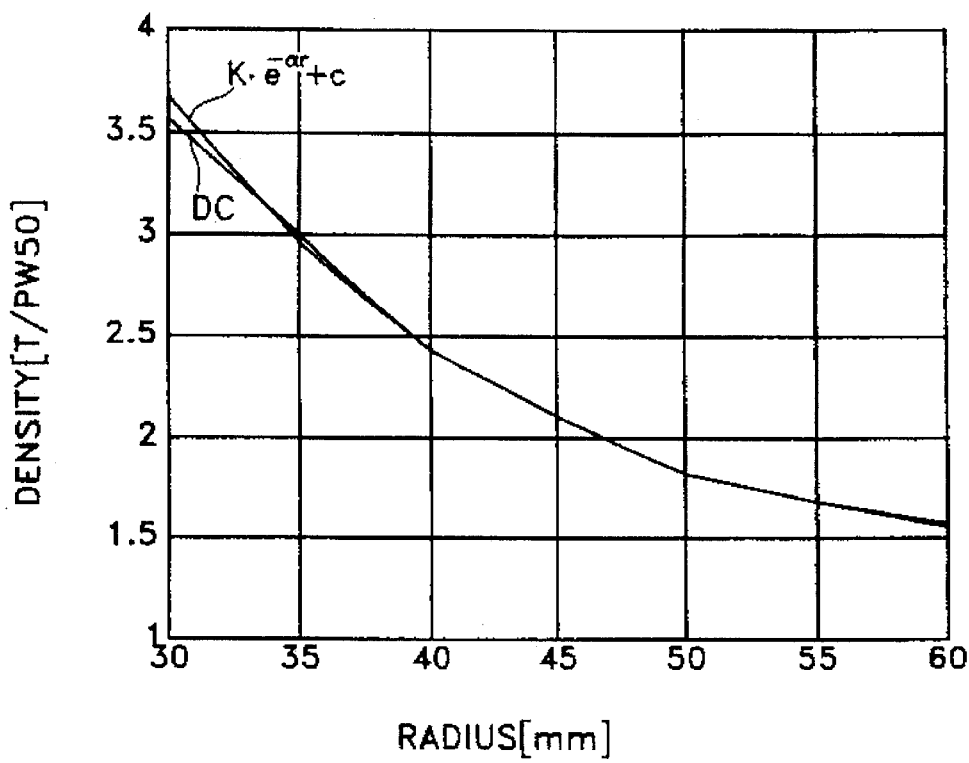
FIG. 6 is a graph showing a modeling characteristic for assuming recording density of the reproduction channel at a different recording radius according to the present invention.

FIG. 6 shows the result of the modeling according to the equation (9). For reproducing data, the apparatus for disk type recording media moves the reproducing head or optical pickup into the track/sector of recorded data. That is, if the track number of the data to be reproduced is known, the disk's recording radius can be calculated. Also, if a channel density is assumed on the basis of the calculated recording radius, the impulse response of the reproducing channel can be assumed and the tap coefficient of the equalizer can be controlled using the assumed impulse response.

$$r = [r_i]MSB - nbit \quad (10)$$

$$PW50 = Ke^{-ar}C \quad (11)$$

$$C_{k+1,i} = C_{ref,i} + \alpha_i PW50_{k+1} + \beta_i \quad (12)$$

Here, i=-N, -N+1, ..., N-1, N

Figure 7:
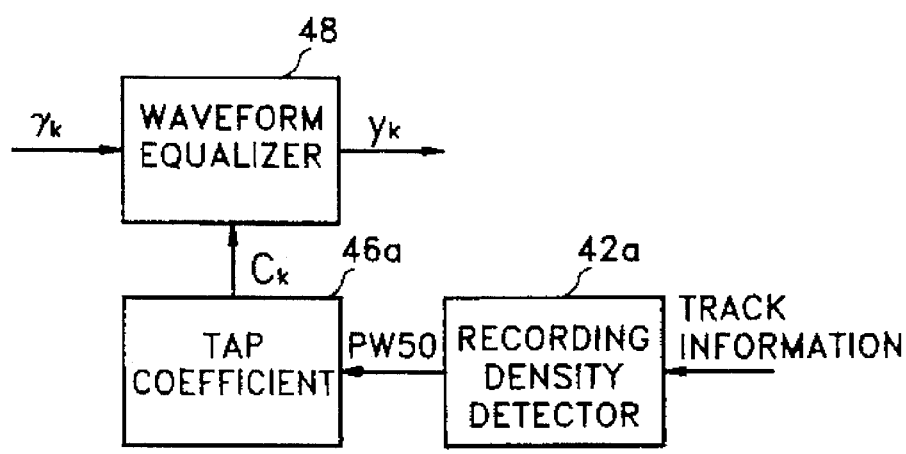
FIG. 7 is a block diagram of the adaptive equalizer of a preferred embodiment according to the present invention.

FIG. 7 is a block diagram of a preferred embodiment of the adaptive equalizer according to the present invention. In this embodiment, recording density detector 42a is constituted by a ROM-table from PW50 according to the track information of equations (10) and (11). Thus, the ROM-table is addressed by track information, and a PW50 value corresponding to the address is output. A tap coefficient controller 46a is composed of a ROM-table in accordance with equation (12), is addressed by the PW50 output from the recording density detector, and outputs a tap coefficient corresponding to the address.

Figure 8:
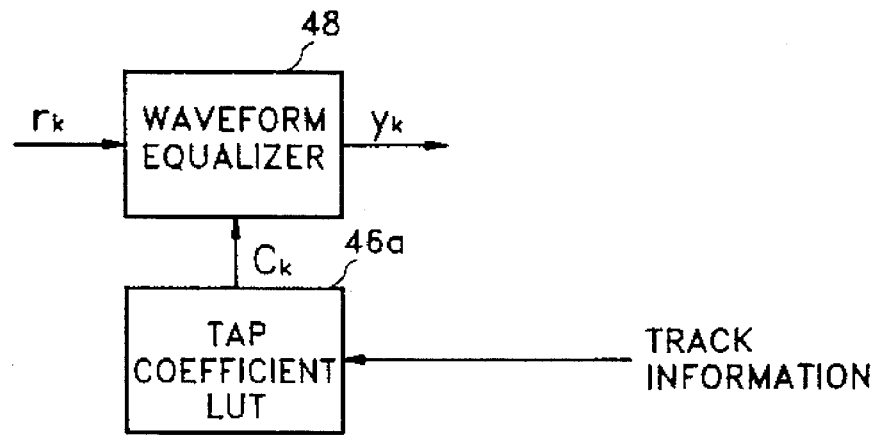
FIG. 8 is a block diagram of the adaptive equalizer of another preferred embodiment according to the present invention.

FIG. 8 shows another preferred embodiment where the recording density detector and the tap coefficient controller are constituted in one ROM-table by the above equations 10, 11 and 12. Thus, tap coefficient controller 46b is addressed by track information and generates a tap coefficient corresponding to the address.

As described above, according to the present invention, the disk radius is obtained in response to track information and the recording density is assumed according to the radius. Since adjacent signal interference is eliminated by varying the tap coefficient according to the assumed recording density, high-speed real-time processing is possible. Also, since the tap coefficient according to the recording density assumption can be controlled by a ROM-table, high-speed operation and a simple circuit structure can be provided. Due to the real-time processing, low performance capacity (due to process latency) can be prevented. Furthermore, since the recording of data for adaptive learning is not required, the data storage capacity of the recording media can be increased.

What is claimed is:

1. An adaptive equalizer for reducing interference between adjacent signals recorded along tracks of a rotatable magnetic recording medium the equalizer comprising:

a recording density detector for calculating a reference recording density of 50 percent of a maximum power channel impulse response from track radius using input track information;

reference tap coefficient storage means for storing a reference tap coefficient determined from the channel impulse response at a lowest recording density position;

a tap coefficient controller for calculating a tap coefficient from the reference recording density and the reference tap coefficient stored in said reference tap coefficient storage means; and a waveform equalizer receiving a reproduced digital signal from a storage medium for eliminating interference from the reproduced digital signal due to a signal recorded adjacent to the reproduced digital signal using the tap coefficient calculated by said tap coefficient controller and for outputting an interference-free reproduced information signal.

2. The adaptive equalizer as claimed in claim 1, wherein said recording density detector comprises a look-up table for generating the reference recording density corresponding to the input track information.

3. The adaptive equalizer as claimed in claim 1, wherein said tap coefficient controller comprises a look-up table for generating the tap coefficient corresponding to the reference recording density.

4. The adaptive equalizer as claimed in claim 1, wherein said recording density detector and the tap coefficient controller comprises a single look-up table for generating the tap coefficient corresponding to the input track information.

* * * * *